(12) United States Patent
Engesser et al.

(10) Patent No.: US 7,033,634 B2
(45) Date of Patent: *Apr. 25, 2006

(54) WHIPPED YOGURT PRODUCTS AND METHOD OF PREPARATION

(75) Inventors: Eric R. Engesser, Grand Rapids, MN (US); Michael D. Engesser, St. Paul, MN (US); Maeve Murphy, Plymouth, MN (US); James E. McGuire, Crystal, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/393,839

(22) Filed: Mar. 21, 2003

(65) Prior Publication Data

US 2003/0224089 A1   Dec. 4, 2003

Related U.S. Application Data

(63) Continuation-in-part of application No. 09/966,849, filed on Sep. 28, 2001.

(51) Int. Cl.
*A23C 9/00* (2006.01)

(52) U.S. Cl. ............... 426/580; 426/564; 426/570; 426/583; 426/654

(58) Field of Classification Search .......... 426/34, 426/130, 564, 570, 573, 576, 580, 583, 654
See application file for complete search history.

(56) References Cited

U.S. PATENT DOCUMENTS

| 3,671,459 A | 6/1972 | Norris |
| 4,273,790 A | 6/1981 | Bosco et al. |
| 4,424,237 A | 1/1984 | Wittman, III |
| 4,434,184 A | 2/1984 | Kharrazi |
| 4,468,408 A | 8/1984 | Bosco et al. |
| 4,851,239 A | 7/1989 | Amen et al. |
| 4,888,194 A | 12/1989 | Andersen et al. |
| 6,242,020 B1 | 6/2001 | Jacobson et al. |

FOREIGN PATENT DOCUMENTS

| DE | 2437574 A | 2/1976 |
| EP | 0 188 318 | 1/1986 |
| EP | 0 479 288 A2 | 10/1991 |
| GB | 2 351 430 A | 1/2001 |
| JP | 59025640 A | 2/1984 |
| JP | 5076321 A | 3/1993 |
| JP | 7265023 A | 10/1995 |
| JP | 3061214 B2 | 7/2000 |
| WO | WO 81/00061 | 1/1981 |
| WO | WO 99/25207 | 5/1999 |

*Primary Examiner*—Leslie Wong
(74) *Attorney, Agent, or Firm*—Annette M. Frawley; John A. O'Toole; Douglas J. Taylor

(57) ABSTRACT

The present invention provides improvements in dairy products especially cultured dairy products such as stirred style yogurt. The improvement provides aerated or whipped yogurt products and methods of preparing such improved whipped yogurt products. The improvement resides in part in the post fermentation addition of a hydrated emulsifier blend to cultured yogurt.

43 Claims, 1 Drawing Sheet

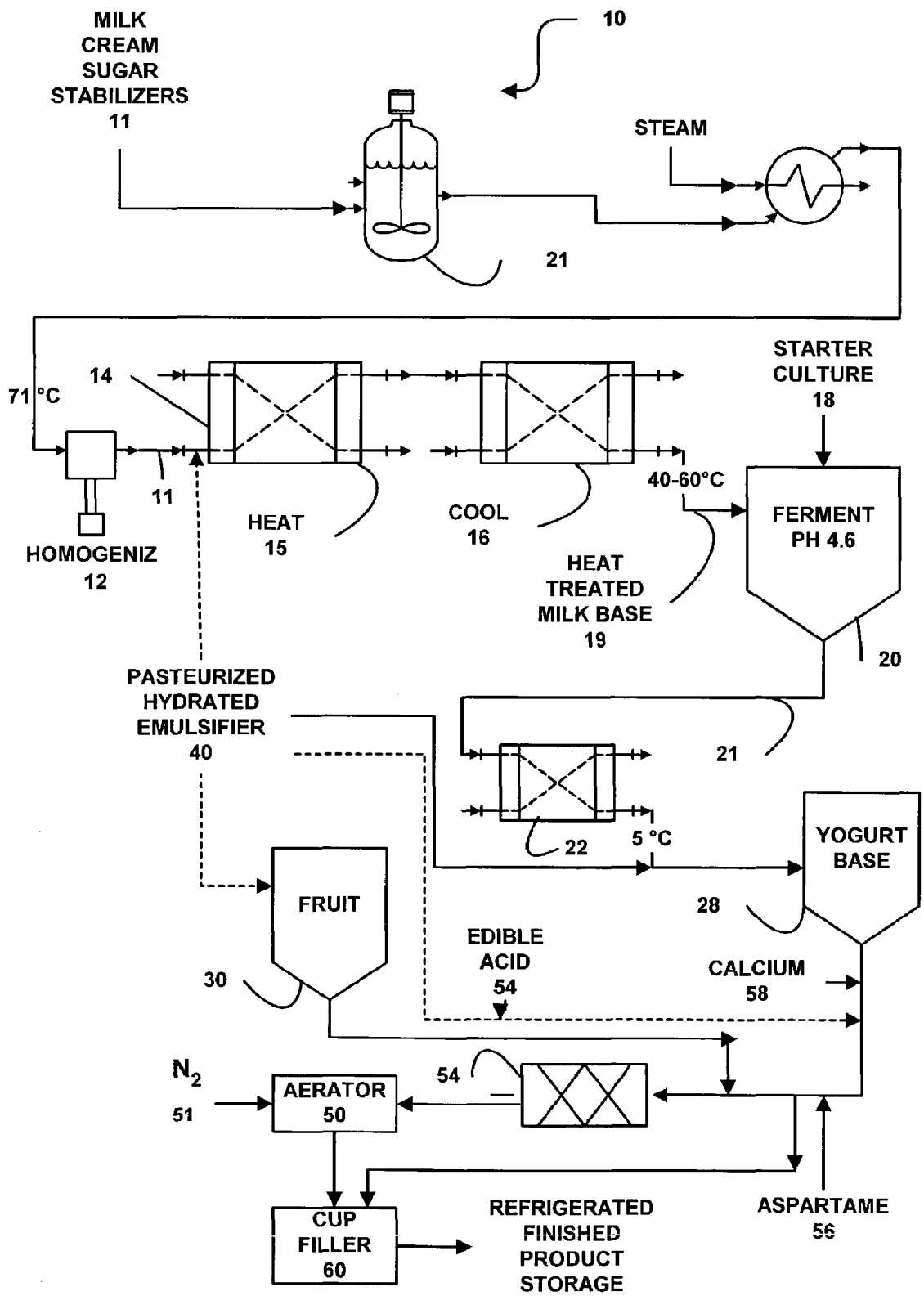

WHIPPED YOGURT PRODUCTS AND METHOD OF PREPARATION

CROSS REFERENCES TO RELATED APPLICATIONS

This application is a continuation-in-part of commonly assigned "Whipped Yogurt Products and Method of Preparation" U.S. application Ser. No. 09/966,849 filed Sep. 28, 2001 to Nair et al., now pending, which is hereby incorporated by reference.

FIELD OF THE INVENTION

The present invention relates to food products and to their methods of preparation. More particularly, the present invention relates to cultured dairy products, especially cultured yogurt products and to their methods of preparation.

BACKGROUND OF THE INVENTION

The present invention provides improvements in dairy products especially cultured dairy products such as stirred style yogurt. The improvement provides aerated or whipped yogurt products and methods of preparing such improved whipped yogurt products.

The improvement resides in part in the pre-fermentation or post fermentation addition of an improved hydrated emulsifier blend to cultured yogurt for improved aeration. A good description of such a hydrated emulsifier blend and methods for preparing is contained in commonly assigned "Food Products and Their Methods of Preparation" filed Mar. 21, 2003 to Engesser et al. Ser. No. 10/393,838 which is incorporated herein by reference.

Yogurt is a nutritious popular dairy product. At retail, yogurt is now available in a wide assortment of varieties of texture, fat content, sweetener type and level, and flavor among other attributes. Other than aseptically packaged yogurt, yogurt is traditionally distributed and consumed with a live culture that requires refrigerated distribution (2° C. to 10° C.).

From a yogurt manufacturing process standpoint, all yogurts fall into one of two styles; namely, 1) set yogurts, and 2) stirred style. The present invention finds particular suitability for use in connection with the provision of stirred style yogurts. Within these broad two classifications, numerous yogurt varieties exist.

In the set style, the manufacturer fills cups or containers with an inoculated but unfermented milk base and queiscently holds the filled cups at warm temperatures (≈40° C. to 50° C.) to allow the yogurt to ferment therein. After the desired fermenting or maturing time, the product is cooled which arrests the culturing activity and also allows the body to set to form the gel-type texture. Set style yogurts have a relatively low initial viscosity (i.e., upon filling of its food package container) and a higher temperature ("temperature of filling") compared to the viscosity of stirred style yogurt products. As the product ferments and then is cooled, its viscosity increases to its final viscosity value. A set style yogurt is characterized by a more firm, gel-like consistency and a higher final viscosity than most stirred style yogurts. In addition to the natural thickening effect of the yogurt culture, a wide variety of thickeners and stabilizers are taught as useful to supplement the yogurt's gel characteristics.

Of course, within this set style, there is a continuum of body firmness. Most set custard style products have quite firm gels although some others are much softer. One variety of a set style yogurt is a "custard" style yogurt. The softer gel products may even be perceived by the consumer as being thinner than even certain stirred style products.

One popular style variant of custard style yogurt is fruit-on-the-bottom, also colloquially referred to as "sundae" style, in which a discrete layer of fruit preserves is on the bottom of the yogurt container and the custard yogurt fills the rest of the container. Fruit on the top style products are similarly prepared, except that the containers are typically inverted after having been allowed to set. Typically, the yogurt phase is unflavored, although occasionally sweetened, and of a white or natural color. This white color is in contrast to the separate fruit preserve layer which often contains additional coloring supplemental to that coloring provided by the ingredients of the fruit preserves. Other than for moisture equilibration, the yogurt layer and the fruit preserve layer usually do not intermix over time due to specific growth difference and the binding effect of pectin in the fruit preserves.

In the second general category of yogurt products, the yogurt is of a stirred type. In producing stirred yogurt products, the manufacturer 1) ferments an inoculated milk base in bulk, e.g., in large stirred fermentation or culturing tanks, 2) cools the yogurt so formed to arrest the fermentation, and then 3) fills the individual yogurt container with thickened yogurt. Such production facilities are run in a continuous or semi-continuous manner. More specifically, after fermentation to desired acidity and thickness, the yogurt is pumped through cooling heat exchangers to arrest the fermentation. Alternatively, the yogurt can be cooled in a two stage process to reduce shear and maximise the viscosity of the product. In a two stage process the yogurt can be first cooled to 70° F.(21° C.) via a cooling plate, thereafter the yogurt can be cooled to 40° F.(4° C.) via a cooling tunnel. Flavorings and sweeteners can be admixed with the cooled yogurt and the yogurt is charged to containers. Care needs to be taken to minimize the shear imparted to the yogurt in practicing such process steps to minimize the loss of thickness or viscosity built up by the fermentation step. Thus, the stirred style yogurt typically has a higher viscosity than set style yogurts upon filling due to the lower temperature and the thickening affect of yogurt culture. Nonetheless, the stirred style yogurt typically builds or increases substantially in viscosity after filling over time until reaching its intended finish viscosity. Of course, stirred yogurts also come in various styles and product variations.

Most commonly, fruit preserves or purees are stirred into the stirred yogurt immediately prior to filling. Such stirred style yogurts comprising intermixed fruit purees are sometimes referred to most frequently as "Swiss" style or, less frequently but equivalently as "Continental" or "French" style. Occasionally, stirred Swiss style yogurts are formulated with excessive amounts of stabilizers with the result that after upon refrigerated storage for 48 hours, the yogurt possesses a solid-like consistency, somewhat reminiscent of custard style yogurt.

As can be appreciated from the above description of the numerous styles and flavors within styles of yogurts, product proliferation and differentiation is an important characteristic of commercial yogurt manufacture. In this highly competitive food product category, there is a continuing desire to develop novel products having distinctive visual, taste, and textural variations in order to stimulate interest in yogurt sales. Current consumer trends favor "light" products, i.e., products of lower fat and/or calorie content.

In particular, it is believed that many consumers will find aesthetically attractive yogurts having a light or aerated texture. Aerated or whipped yogurts can be characterized as having a density reduced from a native range of 1.1 to 1.2 g/cc (depending upon sugar content, fruit content, etc.) to a range of 0.30 g/cc to 1.0 g/cc.

Three primary difficulties are presented by the development of such an aerated cultured dairy product characterized by having reduced density.

First, unlike frozen dairy products such as ice cream or some aerated frozen yogurt or frozen yogurt containing products, conventional yogurt products are unfrozen and are distributed under refrigerated conditions. As a result of the storage temperature, the foam created by aeration is less stable in a refrigerated yogurt product. Conventionally, yogurt enjoy about a 40 to 60 day refrigerated shelf life. Over this shelf life, the aerated yogurt can exhibit undesirable air cell coalescence leading to larger gas cells and even some collapse of the foam.

Second, additives generally employed to increase initial foam volume in food products such as ready-to-spread frostings, other refrigerated milk products, fermented and unfermented soy, rice and nut milk products, beverages and whipped toppings are less stable than the hydrated emulsifier blend used in this invention. For example, additives such as proteins, hydrocolloids, and other emulsifiers are less stable and can exhibit undesirable air cell coalescence leading to some collapse of the foam in contrast to the hydrated emulsifier blend used in this invention.

Third, additives employed to increase initial foam volume and stability over time should not adversely affect other flavor and texture attributes. Notably, proteins added for aeration purposes create an off-flavor in cultured dairy products.

Such hydrated emulsifier blends added to cultured dairy products as described in this invention desirably do not inhibit fermentation times if added post fermentation in product production. Special care must be taken in the formulation and processing of the inoculated milk base to minimize the inhibition of culture growth. Even minor increases in fermentation times reducing rates of production can have disproportionate financial consequences in large scale continuous yogurt production.

Another object of the present invention is to provide stirred style yogurts in the form of aerated yogurts.

Surprisingly, the above limitations and difficulties have now been overcome and the present invention satisfies the above objectives and a long felt need to develop aerated yogurt products for refrigerated distribution with minimal yogurt gel and foam destabilization problems. The present yogurt products are admixed with selected emulsifiers and stabilizers to provide filling and final viscosities and densities within specified ranges. In the preferred embodiment, the present methods reside importantly in part in the preferred post fermentation addition of a hydrated emulsifier blend to yogurt products but prior to aeration.

These and other objects will become increasingly apparent by reference to the following description.

BRIEF SUMMARY OF THE INVENTION

The present invention provides methods for preparing an aerated fortified cultured dairy product. The methods comprise the steps of:
A. providing a dairy product in the form of a non-fruit yogurt base comprising:
  a. about 6% to 24% milk solids;
  b. about 0% to 10% fat;
  c. about 0% to 20% sugar;
  d. about 0.5% to 1.5% gelatin; and
  e. a starter culture;
  having a native density of at least 1.1 g/cc and a temperature of about 4° C. to 30° C.;
B. admixing about 2% to 10% of a hydrated emulsifier blend comprising:
  a. about 0.5% to 1.5% wetting agent;
  b. about 7% to 15% lactylated mono- and di-glycerides;
  c. balance water, and a temperature of about 4° C. to 30° C.;
  to form a yogurt blend;
C. admixing a gas with the yogurt blend;
D. aerating the gas and yogurt blend to form an aerated yogurt having a density of about 0.56 g/cc to 1.0 g/cc; and,
E. cooling the aerated yogurt to a temperature of about 0° C. to 5° C.

In its product aspect of one and the same invention, the present invention provides aerated refrigerated milk products, especially yogurts, and whipped toppings.

BRIEF DESCRIPTION OF THE DRAWING

FIG. 1 represents a preferred embodiment for preparing a cultured dairy product.

DETAILED DESCRIPTION OF THE INVENTION

The present invention relates to improved aerated cultured dairy products especially cultured dairy products such as yogurt and to methods of preparing such improved aerated cultured dairy products. Each of these product components as well as methods of preparation, product use and attributes are described in detail below.

Throughout the specification and claims, percentages are by weight and temperatures in degrees Celsius unless otherwise indicated.

Referring now to the drawing, FIG. 1 depicts, in a highly preferred embodiment, methods for preparing a cultured dairy product are generally designated by reference numeral 10. Conveniently, methods 10 essentially comprises the steps of providing 20 a fermented stirred yogurt, admixing 40 a hydrated emulsifier blend, aerating 50 to form an aerated yogurt and, in more preferred embodiments, further essentially comprising, filling 60 containers with the aerated yogurt.

Step 20 can comprise the substeps of providing a dairy base mix 11, optionally homogenizing the dairy base mix 12, heat treating the homogenized dairy base mix 15, bringing the pasteurized dairy base mix to fermenting temperatures 16 such as by cooling to produce a heat treated milk base 19, adding a starter culture 18, and fermenting to desired acidities 20. A good description of preparing a fermented stirred yogurt is contained in commonly assigned U.S. Pat. No. 5,820,903 entitled "Calcium fortified yogurt and Methods of Preparation" (issued Oct. 13, 1998 to Fleury et al.).

Briefly, the process typically begins with forming or providing a dairy base mix comprising at least one fermentable dairy ingredient. The fermentable dairy ingredient can comprise raw milk but can contain a combination of whole milk, skim milk, condensed milk, dry milk (dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. While not preferred, the milk base can include a filled milk component, i.e., a milk ingredient having a portion supplied by a non-milk ingredient, e.g., oil or soybean milk.

While in the present invention, particular emphasis is directed towards fermented bovine milk products such as yogurt, the skilled artisan will appreciate that the present invention is also suitable for use in a wide variety of food products, particularly ready-to-spread frostings, other refrigerated milk products, fermented and unfermented soy, rice and nut milk products, beverages and whipped toppings.

Also, while bovine milk is preferred, other milks can be used in substitution for bovine milk whether in whole or in part, e.g., camel, goat, sheep or equine milk. In less preferred embodiments, the base mix can comprise a vegetable milk such as soy milk.

The dairy base can further include sweeteners. The dairy base mix can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup and mixtures thereof.

Conveniently, the milk ingredients and sweeteners (such as fructose, corn syrup, sucrose) can be blended in a mix tank 21. Stabilizers and thickeners such as starch, pectin, agar and carrageenan may also be added if desired.

The dairy base mix further preferably comprises a bovine, porcine, or piscine gelatin. In view of religious dietary concerns a bovine gelatin is preferred, more preferably a bovine gelatin in the range of about 200 to 250 bloom strength, most preferred Type B bovine gelatin in the range of about 220 to 230 bloom strength.

The dairy base mix further preferably comprises a calcium sequestrant 58 in amounts sufficient to prevent premature precipitation of the protein content in the dairy base mix. By premature protein precipitation is meant any protein coagulation during the heating or pasteurization or cooling steps. It is desirable that thickening of the dairy product occurs after the heat treatment such as during the fermentation step.

Suitable soluble calcium or sequestrants to use are sodium or potassium citrates (e.g., trisodium citrate), phosphates, acetates, tartrates, malates, fumarates, adipates, ascorbates and mixtures thereof. Especially preferred for use herein as the sequestrant is a mixture of sodium citrate and sodium hexametaphosphate in a 15 to 20:1 weight ratio.

Generally, the amount of sequestrant will depend upon the amount of cultured dairy ingredient. Good results are obtained when the cultured dairy ingredient to sequestrant(s) ratio ranges for example, about 1.5:1 to about 10:1, preferably about 2:1 to about 4:1.

The dairy base ingredients are admixed to form an homogeneous or well blended mix. Next, the dairy base mix 11 is optionally homogenized 12 in a conventional homogenizer to disperse evenly the added materials and the fat component supplied by various ingredients thereby forming an homogenized dairy base mix 13. If desired, the dairy base mix 11 can be warmed prior to homogenization from typical milk storage temperatures of about 5° C. to temperatures of about 65 to 75° C., preferably about 71° C.

This homogenized dairy base mix 13 is then essentially heat treated or pasteurized 14, typically by heating for times and temperatures effective to accomplish pasteurization to form a pasteurized or heat treated dairy base mix or blend 15. As is well known, the dairy base mix 11 can be heated to lower temperatures for extended times, e.g., 88° C. for 30 minutes, or alternately to higher temperatures, e.g., 95° C., for shorter times, e.g., for about 38 seconds. Of course, intermediate temperatures for intermediate times can also be employed. Other pasteurization techniques or, less preferably, even sterilization, can be practiced (e.g., light pulse, ultra high temperature, ultra high pressure, etc.) if effective and economical. In certain commercial practices, the sequence of the homogenization and pasteurization steps can be reversed.

Especially preferred herein is a pasteurized dairy base mix comprising a dairy base having a moisture content of about 70 to 85% and a pH of about 6.0 to 6.6 and comprising about 0.05 to 5% of a cultured dairy ingredient wherein the cultured dairy ingredient has a calcium content of about 10 to 25%. The pasteurized dairy base further includes a calcium sequestrant on a weight ratio of cultured dairy ingredient to sequestrant of about 1.5:1 to 10:1, preferably about 2:1 to 4:1.

In the present preferred methods, the homogenized and pasteurized dairy base mix is then brought to incubation temperature, usually about 40 to 46° C. When heat pasteurization is employed, this step typically is followed by a cooling step 16.

Thereafter, the homogenized and pasteurized dairy blend mix is inoculated with a desired starter culture 18 such as a starter yogurt culture in the preferred method. Usually, a yogurt starter culture includes a combination of *Lactobacillus bulgaricus* (*Lactobacillus delbrucki* subsp. *bulgaricus*) and *Streptococcus thermophilus*. In other variations, the yogurt culture can additionally include a *Lactobacillus acidophilus*, *Lactbacillus bifidus*, Lactobacillus subsp. *casei*, *Lactobacillus delbrucki* subsp. *lactis*, and/or *Bifidobacterium bifidus* bacteria.

The present methods further comprise a fermentation step 20. In the preferred preparation of a yogurt herein, the fermentation step 20, is quiescently continued until the pH of the inoculated dairy base mix blend reaches approximately 4.2 to 4.6 to form a yogurt base 21. Depending upon temperature and amount of culture added, this may take from about three to about 14 hours. In the preparation of a stirred style yogurt product, it is important that the mixture agitation be minimized during the fermentation process to allow proper curd formation. After fermentation to desired acidity and thickness, the dairy blend mix is pumped through cooling heat exchangers to arrest the fermentation.

Thereafter, the present methods further comprise admixing a hydrated emulsifier blend 40 at a temperature of about 4° C. to 30° C. with the dairy blend mix to form a yogurt blend. Better results are obtained when the hydrated emulsifier blend is admixed with the dairy blend mix at a temperature of about 4° C. to 15° C. and for best results about 4° C. to 7° C.

The hydrated emulsifier blend comprises;
  about 0.5% to 1.5% of the aqueous dispersion of a wetting agent;
  about 5% to 15% of the aqueous dispersion of a hydrated lactylated mono- and di- glycerides; and, the balance water.

The hydrated emulsion blend is at least pasteurized and cooled to a temperature of 4° C. to 30° C., preferably 4° C. to 15° C., and for best results 4° C. to 7° C.

The hydrated emulsifier blend preparation methods comprise a first essential step of preparing an at least pasteurized hydrated emulsifier composition. In preferred embodiments, this first essential step can involve a first sub-step of 1. adding a first emulsifier or wetting agent to hot water to form a clear mixture. The wetting agent facilitates dispersion of the lactylated emulsifiers in the water to form the hydrated emulsifier composition. The wetting agent is selected from the group consisting of ctiric acid esters of monoglycerides, diacetyl tartaric acid esters of monoglycerides, polysorbates, propylene glycol esters, sodium dodecyl sulphate, sodium stearyl lactylate and mixtures therein. Most preferred for use herein due to its effectiveness in low pH systems is diacetyl tartaric acid esters of monoglycerides.

Surprisingly, diacetyl tartaric acid esters of monoglycerides ("DATEM") are found to be more functional than other wetting agents in a low pH system, such as the low pH system found in yogurt. The use of DATEM appears to minimize the amount of wetting agent which precipitates from the hydrated emulsifier blend. Additionally, DATEMs functionality appears to be less affected by the age of the lactylated mono- and di-glycerides comprised within the emulsifier blend than other wetting agents.

As the blend of lactylated mono- and di-glycerides ages the pH drifts downward, becoming more acidic resulting in a lower pH system which can be undesirable for wetting agents. DATEM is less susceptible than other wetting agents to the pH drift of the lactylated mono- and di-glycerides, allowing the DATEM to more effectively wet the lactylated mono- and di-glycerides.

The amount of wetting agent added to the composition has a direct effect on the viscosity of the hydrated emulsifier. Since the hydrated emulsifier will be added at refrigerated temperatures (generally about 1° C. to 7° C.) to the refrigerated dairy blend mix for ease of handling and mixing without imparting shear to the dairy blend mix, the hydrated emulsifier composition is desirably characterized by a thin texture, i.e., a low viscosity. Good results are obtained with low viscosity hydrated emulsifier compositions having viscosities ranging from about 5,000 to 40,000 cps, preferably ranging from about 10,000 to 25,000 cps when added to cultured dairy products at refrigeration temperatures.

The first essential step of preparing an at least pasteurized hydrated emulsifier composition can further comprise a second sub-step of adding a second emulsifier ingredient that is an emulsifier blend of lactylated mono- and di-glycerides to the thoroughly intermixed wetting agent and hot water. The lactylated blend of mono- and di-glycerides is selected from the group consisting of lactylated mono- and di-glycerides, citrate acid esters of mono- and di-glycerides, and distilled monoglyerides. It should be noted that gentle agitation can be beneficially maintained throughout the preparation of the hydrated emulsifier.

The hydrated emulsifier blend can comprise about 5% to about 15% of the second emulsifier blend.

The completion of the hydration can be visually determined by observing the formation of a white viscous mass that gradually thickens as it is cooled to a temperature of 4° C. to 30° C. preferably 4° C. to 15° C., and for best results 4° C. to 7° C.

The admixed hydrated emulsifier blend so prepared has a native pH in the range of 6.0 to 6.5.

The third essential step comprises at least pasteurization of the hydrated emulsifier. Since it is intended that the hydrated emulsion can be added directly to an already fermented dairy culture base, pasteurization provides bacteriological stability for a blended dairy/hydrated emulsifier product that does not receive further bacteriological treatment such as heat processing. Also, pasteurization is desirable to allow for production of the hydrated emulsifier blend at one production facility and transportation to a separate dairy product manufacturing facility with a reduction in the spoilage tendency of the hydrated emulsifier during transport and storage. The hydrated emulsifier blend surprisingly can be packaged and transported from the production facility to a separate dairy product manufacturing facility in about one metric ton quantities via appropriate aseptic stainless steel containers, commonly referred to as totes. Alternatively, the hydrated emulsifier blend can be packaged and transported in a variety of plastic containers easily identified by one skilled in the art.

In other contemplated uses of the hydrated emulsifier blend, such as the pre-fermentation addition to a pasteurized dairy blend mix, pasteurization of the hydrated emulsifier is also desirable. Pasteurization of the hydrated emulsifier prevents the degradation of a pasteurized dairy base when admixed. In addition, pasteurization of the hydrated emulsifier prior to admixture with the dairy blend mix allows for post-pasteurization addition of the hydrate to the dairy blend mix. Such post-pasteurization addition in turn desirably allows the dairy blend mix to be prepared via or with high temperature, short time ("HTST") pasteurization, and the hydrated emulsifier to be prepared via batch pasteurization if desired. The hydrated emulsifier blend pasteurization step is accomplished either through batch pasteurization or high temperature, short time (HTST) pasteurization.

Batch pasteurization is preferred, as the hydrated emulsifier does not develop a high viscosity as a result of this technique. The viscosity of the hydrated emulsifier is dependent in important part on the amount of shear the hydrate undergoes. Batch pasteurized hydrate does not develop a high viscosity, whereas HTST as a result of a high flow of product and pumping can develop a fair amount of shear and a high viscosity. It is more critical to agitate the hydrated emulsifier pasteurized via HTST, in order to control and lower the viscosity, however agitation during cooling is always helpful in controlling the critical viscosity.

Continuous pasteurization of the hydrated emulsion requires the hydrated emulsion be continually agitated during cooling to prevent large increases in viscosity.

The admixed hydrated emulsifier has a native pH in the range of 6.0 to 6.5.

The hydrated emulsifier blend can optionally be admixed with an edible organic acid 54 prior to addition to the dairy blend mix. In preferred embodiments, the hydrated emulsifier blends pH can be lowered with the addition of an edible organic acid from a native pH in the range of 6.0 to 6.5, to a range of about 3.7 to 4.7 prior to admixture with a yogurt base in order to minimize acid shock to the dairy base mix having a pH in the range of about 4.3 to 4.7. In the edible organic acid admixed with hydrated emulsifier embodiment, the hydrated emulsion blend is essentially characterized by a pH in the range of about 3.7 to 4.7, more preferably about 4.2 to 4.7, and for best results about 4.5. Such low pH hydrated emulsions have a shelf-life of up to 3 months at refrigerated temperatures. Thus allowing extended storage of the hydrated emulsifier blend prior to admixture with the dairy blend mix. The pH can be conveniently lowered by adding an edible acid to the hydrated emulsion such as edible organic acids selected from the group consisting of citric acid, lactic acid, malic acid, succinic acid, tartaric acid, and mixtures thereof. The acid addition can be achieved by several methods, examples of which are incorporated by reference above. Preferred for use herein is citric acid for taste and cost considerations. In other variations, buffers systems, e.g., a mixture of citric acid and sodium citrate can be used.

The hydrated emulsifier can also be optionally admixed with a fruit prep base 30 prior to admixture with the dairy blend mix. This method additionally alleviates acid shock to a yogurt base in the preferred method. In the fruit base/hydrated emulsifier variation, the pH of the hydrated emulsifier blend can be lowered to about 4.0 to 4.7 by co-blending the cooled pasteurized hydrated emulsifier blend with an aseptic fruit prep base in a weight ratio of hydrated emulsifier blend to fruit prep base from about 1:1 to about 1.25:1, to form an emulsion bearing fruit prep base. The emulsion bearing fruit prep base can then be added to a dairy base mix.

Addition of an unacidified hydrated emulsifier with a pH in the range of 6.0 to 6.5 can result in a higher pH yogurt product having safety concerns. If the pH of the finished yogurt product is greater than 4.8, the product exhibits greatly reduced bacteriological stability. Furthermore, since pH affects the gelling properties of milk proteins and flavor, maintenance of the pH within the recited range allows for addition to a yogurt base without further processing or formulation manipulation.

The hydrated emulsion is superior in that the hydrated emulsion can form large aircells in a dairy blend mix at a much faster rate in contrast to other emulsions, while providing more shelf-stable aircells.

In addition, in contrast to other emulsions, the improved hydrated emulsion provides a greater increase in viscosity in the cultured dairy blend mix. The higher viscosity is more desirable as it assists in setting the matrix of the food base faster.

The dairy blend mix in combination with the hydrated emulsifier can be admixed gently at 5 to 15 rpm.

The dairy blend mix in combination with the hydrated emulsifier can then be admixed with a gas 51, preferred for use herein can be nitrogen. The gas can be charged into the dairy blend mix. Any conventional method can be used. For example, the gas can be forced through small orifices into the composition as the composition flows through a tube or vessel into a mixing chamber, where uniform distribution occurs. Any conventional nontoxic, odorless, tasteless propellant, such as air, nitrogen, nitrous oxide, carbon dioxide and mixtures thereof can be used.

The present invention additionally essentially comprises the step of aerating or whipping 60 the dairy blend mix with temperature maintenance from a native density of about 1.1 g/cc to a density of about 0.56 g/cc to 0.9 g/cc, preferably 0.70 g/cc to 0.80 g/cc to form an aerated dairy blend. The skilled artisan will have little difficulty selecting a commercially available aerator/mixer for use herein. Preferred for use herein is a Tanis Rotoplus 250 aerator available from Tanis Food Tee in The Netherlands. The Tanis Rotoplus aerator consists of a mixing chamber fed by a positive displacement pump and air flow system. Product flow is controlled by pump speed adjustment and air flow is controlled by flowmeter adjustment. Stainless steel concentric rows of intermeshing teeth on a stator and a rotor produce a uniformity and consistency in the mix. A coolant, for example glycol, can be used in a jacket surrounding the mix chamber to maintain a preferred constant temperature of 4° C. to 30° C., preferably 4° C. to 15° C., and for best results 4° C. to 7° C. during aeration. The mixer can shear the dairy blend mix and propellant, thus allowing the hydrated emulsifier blend to adhere and maintain separation of the dairy blend mix and propellant creating the desirable aircells.

A pressure of about 0.033 ksi to 0.065 ksi can be maintained in the mixer to aid in the formation of aircells. The aerated dairy blend can be gradually transported from about 0.050 ksi to atmospheric pressure, the gradual shift in pressure reduces aircell collapse.

The preferred ratio of dairy blend mix/gas is 2:1, but can be in the range of about 99:1 to 1:1.

During aeration, it is very important to control temperature so desirable large visible aircells form more readily during the aeration step. Maintaining the temperature between 4° C. to 30° C., preferably 4° C. to 15° C., and for best results 4° C. to 7° C. is important to controlling the final density of the product, in turn, is important to fast formation of large visible aircells and to minimizing air cell collapse upon extended storage. It will be appreciated that desirable large visible aircells form at 24 to 48 hours with whipping and filling temperatures of between 4° C. to 30° C., preferably 4° C. to 15° C., and for best results 4° C. to 7° C.

In a less preferred embodiment the aerated dairy blend mix can be developed by decreasing the amount of gelatin in the dairy base, increasing the temperature of the product to about 30° C. to 45° C., admixing the hydrated emulsifier at a temperature of about 30° C. to 45° C., and thereafter admixing the nitrogen gas at atmospheric pressure. In the less preferred method, the aerated dairy blend develops less desirable aircells and develops a less desirable finished texture.

The aerated dairy blend or other cultured dairy product such as yogurt, with or without fruit (whether blended with the yogurt base or as a separate phase) is then transported to a holding tank and then to a filler, and finally placed in a conventional container such as a coated paper or plastic cup or tube fabricated from a flexible film. The tube fabricated from a flexible film can contain about 50 to 100 cc of the aerated dairy blend. In the preferred embodiment the aerated yogurt can be held in the holding tank for about 5 to 15 minutes. After filling, the filled containers are applied with a lid or other closure or seal means, assembled into cases and entered into refrigerated storage for distribution and sale. About 24 to 48 hours after fill, the aircells can achieve a visible size, in the order of about 130 to 30,000 μm. About 24 to 48 hours after fill, the aerated dairy blend can achieve a viscosity of about 52,000 cps to 55,000 cps.

In certain embodiments, particularly low fat and/or low calorie variations, the dairy product herein comprises a high potency non-nutritive carbohydrate sweetening agent. Exemplary high potency sweeteners include aspartame, neotame, sucrose, potassium acelsufame, saccharin, cyclamates, thaumatin and mixtures thereof. Especially preferred for use herein is aspartame 56. Illustrative flavors include vanilla, amaretto, cheesecake, white chocolate, Café Au Lait, caramel apple, banana cream, lemon, lime, various fruit and berry flavors and mixtures thereof.

Optional Ingredients

If desired, the dairy product can additionally include a conventional fruit sauce or puree. If present, the fruit constituent can comprise about 5 to about 15% of the yogurt product. The present method thus can comprise the optional additional step of adding a fruit sauce or puree 50. The fruit sauce or puree can optionally comprise fortification such as vitamins, minerals, inulin, etc.

In the manufacture of Swiss-style yogurt, a fruit flavoring is blended substantially uniformly throughout the yogurt after fermentation is complete but prior to packaging. A static mixer 54 can be used to blend the fruit sauce into the yogurt with minimal shear.

In the manufacture of "sundae" style yogurt, fruit flavoring is deposited at the bottom of the consumer container, and the container is then filled with the aerated yogurt mixture. To prepare a sundae style yogurt product employing a stirred style yogurt, the milk base is prepared with added thickeners and/or stabilizers to provide upon resting a yogurt texture that mimics a "set" style yogurt. In this variation, the fruit is added directly to the container, typically to the bottom, prior to filling with the yogurt.

The fruit flavoring sauce or puree used in the invention may be any of a variety of conventional fruit flavorings commonly used in yogurt products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH. Minor amounts (e.g., providing less than 50 mg of calcium per 226 g serving) of calcium can be added to the fruit to control the desired texture of the fruit preparation typically provided by a soluble calcium material such as calcium chloride.

If aspartame is added to the dairy blend mix, all or a portion of the aspartame can be pre-blended with the fruit flavoring.

If desired, the dairy base mix can be formulated with thickeners and setting agents that will set up after cup filling that will impart a texture to the yogurt that mimics a set-style type yogurt product.

The products can additionally include a variety of other ingredients to increase their nutritional, organoleptic or other consumer appeal, e.g., fruit pieces, nuts, partially puffed cereals, etc.

Description of Finished Product Attributes

The aerated refrigerated finished yogurt products so prepared exhibit a desirable light texture and organoleptic attributes. These texture and organoleptic attributes are surprisingly stable during expected shelf lives ranging up to 60 days and the present aerated products exhibit minimal stability against aerated foam collapse. During the expected refrigerated shelf life, the products maintain their light density and viscosity as well as visual appearance against generation of large aircells or bubbles. Of course, care must be taken during commercial distribution and storage to maintain the products at refrigerator temperatures to minimize product degradation that can occur due to excessive cold (freezing) or heat (accelerated product spoilage).

EXAMPLE

A low density aerated yogurt of the present invention was prepared having the following formulation.

| Ingredients | Low density aerated yogurt (Wt. %) |
|---|---|
| Water | 67.05 |
| Non-Fat Dried Milk | 11.354 |
| Cream | 5.495 |
| Sugar | 14.210 |
| Starch | 1.050 |
| Gelatin | 0.840 |

| Ingredients | Low density aerated yogurt (Wt. %) |
|---|---|
| | 100.00% |

A yogurt base comprising water, non-fat dried milk, cream, sugar, starch and gelatin was homogenized and pasteurized. The heat treated base was cooled and starter culture added. The cultured yogurt base was fermented to a pH of 4.3 and thereafter cooled to refrigeration temperatures. Thereafter, the hydrated emulsifier blend consisting of water, DATEM, and a lactylated blend of mono- and diglycerides available from Danisco Cultor in Copenhagen, Denmark under the trade designation Lactem P22 in a ratio of hydrated emulsifier/yogurt base of 1:25 at a temperature of 5° C. was folded into the yogurt base.

The yogurt blend was then aerated with nitrogen gas in a Tanis Rotoplus 250 aerator to a finished density of 0.75 g/cc. The aerated product was placed in a holding tank for 5 minutes and then packaged in plastic containers with minimal shear. Additionally in a preferred embodiment $CO_2$ can be added to the plastic container headspace as described in commonly assigned entitled "Packaged Food Articles With Enriched Headspace and Method of Preparation" U.S. Ser. No. 09/464,779 filed Jan. 17, 1999 to Archibald et al., now U.S. Pat. No. 6,793,950 which is incorporated by reference herein. Thereafter, the packaged product is stored at refrigerator temperatures. Within 24 to 48 hours aircells become visible in the aerated yogurt.

While the invention finds particular suitability for a connection with yogurt, the skilled artisan can appreciate that the invention can also be used in connection with other food products such as ready-to-spread frostings, other refrigerated milk products, fermented and unfermented soy, rice and nut milk products, beverages, and whipped toppings.

The invention claimed is:

1. A method of producing an aerated milk product, comprising the steps of:
   A. Providing a milk blend comprising a milk ingredient and about 2% to about 10% of a hydrated emulsifier ingredient comprising:
      a. about 0.5% to 1.5% wetting agent;
      b. about 7% to 15% lactylated mono- and di-glycerides;
      c. balance water; wherein the hydrated emulsifier blend has a viscosity of about 5,000 cps. to 40,000 cps. at refrigeration temperatures, and
   said milk blend having a temperature of about 4° C. to 30° C. and an initial density of at least 1.1 g/cc;
   B. admixing a gas with the milk blend;
   C. aerating the gas and the milk blend to form an aerated milk product;
   D. cooling said aerated milk product to a temperature of about 0° C. to 5° C. to form a cooled shelf-stable aerated milk product;
   E. packaging said cooled shelf-stable aerated milk product; wherein the cooled shelf-stable aerated milk product contained within a package having within 24 to 48 hours a finished density of about 0.56 g/cc to 1.0 g/cc for up to 60 days at atmospheric pressure.

2. The method of claim 1 wherein the gas of step B is selected from the group consisting of air, carbon dioxide, nitrogen, nitrous oxide, and mixtures thereof.

3. The method of claim 1 wherein the milk blend of step A has a temperature of 4° C. to 10° C.

4. The method of claim 1 wherein the milk blend of step A has a temperature of 4° C. to 7° C.

5. The method of claim 1 wherein at least a portion of the milk ingredient is fermented.

6. The method of claim 5 wherein at least a portion of the fermented milk ingredient is yogurt.

7. The method of claim 1 wherein the aerated milk is at a finished pH of 4.4 to 4.8.

8. The method of claim 1 wherein the hydrated emulsifier is at a temperature of 4° C. to 7° C.

9. The method of claim 1 wherein the hydrated emulsifier blend of step A is admixed at a temperature of 4° C. to 10° C.

10. The method of claim 1 wherein the hydrated emulsifier blend of step A is admixed at a temperature of 4° C. to 7° C.

11. The method of claim 6 wherein the hydrated emulsifier of step A is added to the milk ingredient pre-fermentation.

12. The method of claim 6 wherein the hydrated emulsifier of step A is added to the milk ingredient post fermentation.

13. The method of claim 1 wherein the lactylated blend of mono- and di-glycerides is selected from the group consisting of lactylated mono- and di-glycerides, citrate acid esters of mono- and di-glycerides; and distilled monoglycerides.

14. The method of claim 1 wherein the viscosity of the milk blend in step A is at least 6000 cps.

15. The method of claim 1 wherein the aerated milk product has an aerated density of about 0.70 g/cc to 0.80 g/cc.

16. The method of claim 1 wherein the aerated milk product has an aerated density of about 0.75 g/cc.

17. The method of claim 1 additionally comprising the step of:
    maintaining the cooled aerated yogurt product at refrigeration temperature through distribution and retail sale.

18. The aerated milk product prepared in accordance with the process of claim 5.

19. The aerated fermented milk product prepared in accordance with the process of claim 1.

20. The aerated yogurt product prepared in accordance with the process of claim 13.

21. A low density aerated milk composition which retains an aerated texture for an extended shelf life, comprising:
   A. about 85% to 95% of a milk ingredient;
   B. about 2% to 10% of a hydrated emulsifier blend comprising a wetting agent;
   wherein the wetting agent is diacetyl tartaric acid esters of monoglycerides; and
   C. an aerating gas;
   wherein the aerated milk composition has a finished density of about 0.56 g/cc to 1.0 g/cc.

22. The composition of claim 21 wherein the milk ingredient of step A is a milk blend that comprises:
   a. about 6% to 24% milk solids;
   b. about 0% to 10% fat;
   c. about 0% to 20% sugar;
   d. about 0.5% to 2% starch;
   e. about 0.5% to 1.5% gelatin; and
   f. a starter culture.

23. The composition of claim 22 wherein the gelatin is selected from the group consisting of bovine, porcine, piscine and mixtures thereof.

24. The composition of claim 23 wherein the bloom strength of the gelatin is about 200 to 250.

25. The composition of claim 23 wherein the bloom strength of the gelatin is about 230.

26. The composition of claim 21 wherein the finished density is about 0.70 g/cc to 0.80 g/cc.

27. The composition of claim 21 wherein the finished density is about 0.75 g/cc.

28. The composition of claim 22 comprising about 2% to 4% fat and wherein the fat is a dairy fat.

29. The composition of claim 21 wherein the composition is refrigerated.

30. The composition of claim 21 additionally comprising a fruit prep.

31. The composition of claim 21 additionally comprising a fortified fruit prep wherein the fortificant is selected from the group consisting of vitamins, minerals, inulin, and mixtures thereof.

32. The composition of claim 21 wherein a quantity is packaged in a coated paper cup.

33. The composition of claim 21 wherein a quantity is packaged in a plastic container.

34. The composition of claim 33 wherein the container is a plastic cup.

35. The composition of claim 33 wherein the container is a tube fabricated from a flexible film.

36. The composition of claim 33 wherein the tube is fabricated from a flexible film contains about 50 to 100 cc.

37. The composition of claim 22 wherein at least a portion of the milk ingredient is pasteurized bovine milk.

38. The composition of claim 37 wherein the gas is nitrogen.

39. The composition of claim 37 wherein the fat content is less than about 10%.

40. The composition of claim 37 maintained at refrigerator temperatures.

41. The composition of claim 40 having a viscosity of about 52,000 to 55,000 cps.

42. The composition of claim 41 having a fat content of about 1% to 5% and wherein the milk ingredient is a stirred, style yogurt having a pH of about 4.3 to 4.7.

43. The method of claim 1 wherein the wetting agent is selected from the group consisting of citric acid esters of monoglycerides, diacetyl tartaric acid esters of monoglycerides, polysorbates, propylene glycol esters, sodium dodecyl sulphate, sodium stearyl lactylate, and mixtures thereof.

* * * * *